Oct. 3, 1950 J. R. ORELIND 2,524,205
TRACTOR IMPLEMENT
Filed Dec. 29, 1945 2 Sheets-Sheet 1
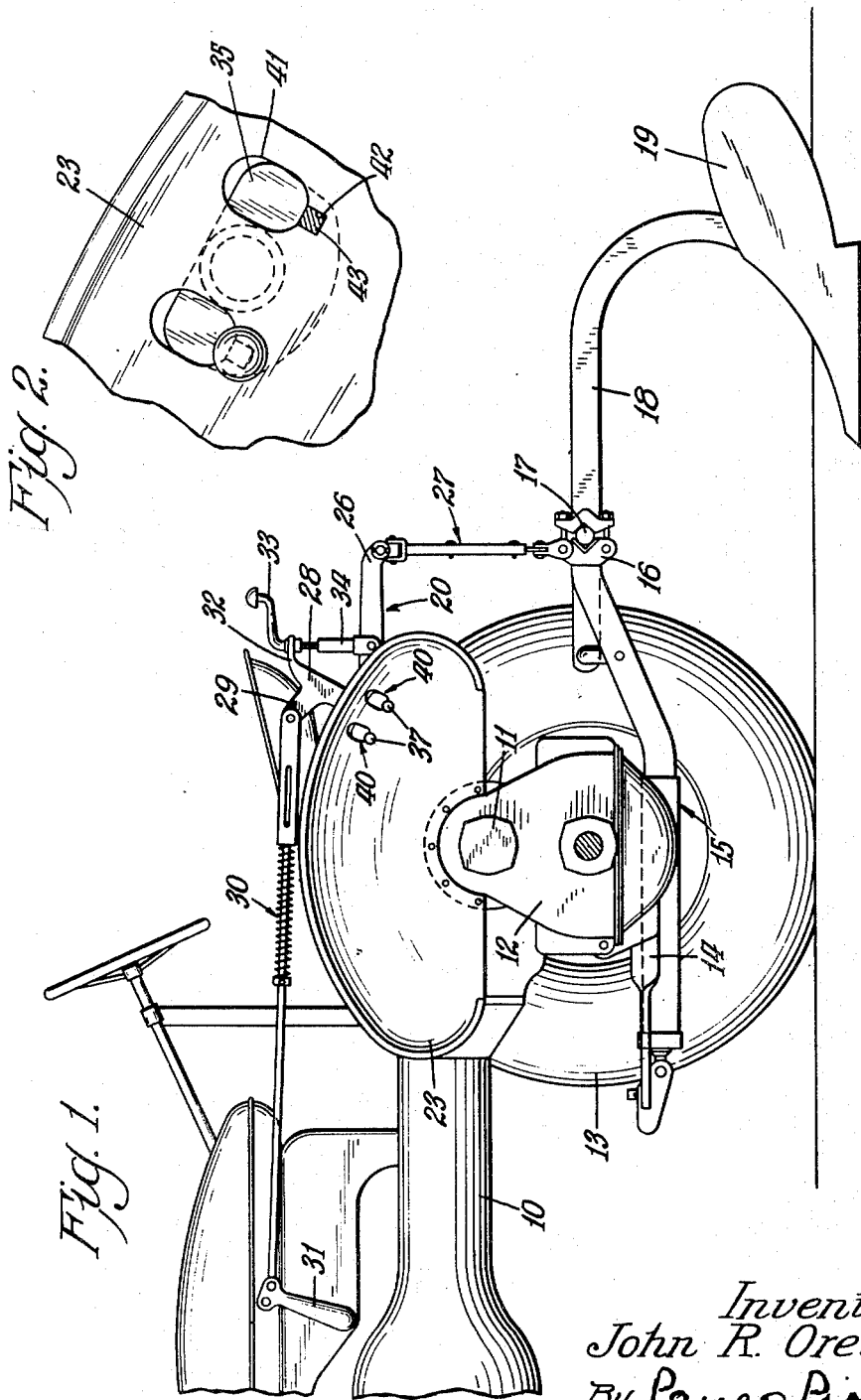
Inventor:
John R. Orelind
By Paul O. Pippel
Atty.

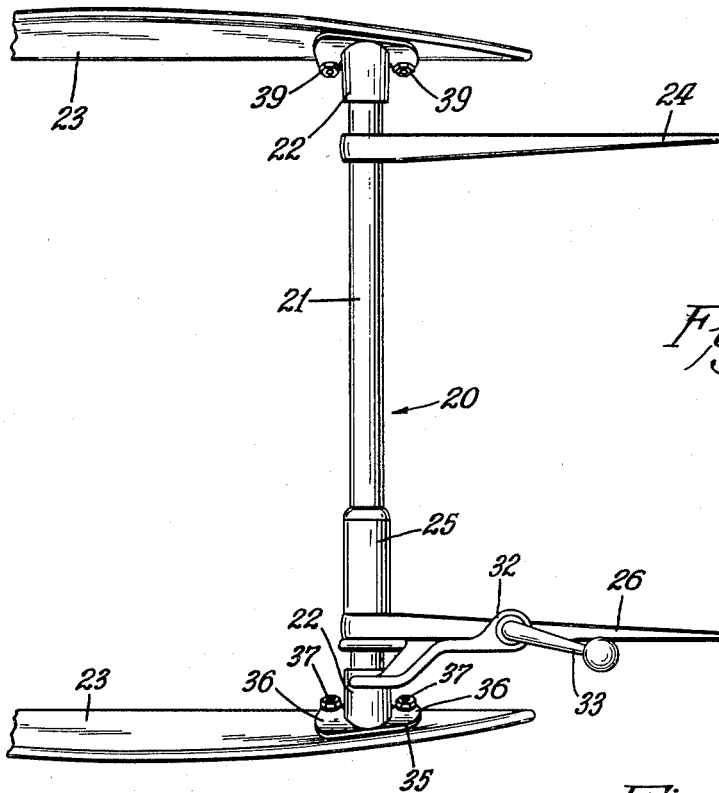
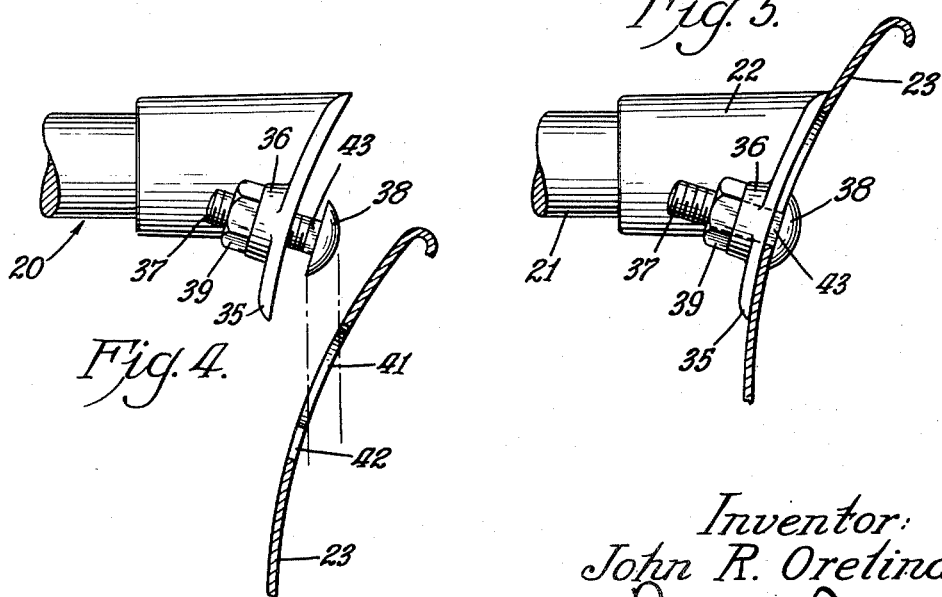

Patented Oct. 3, 1950

2,524,205

UNITED STATES PATENT OFFICE 2,524,205

TRACTOR IMPLEMENT

John R. Orelind, Wilmette, Ill., assignor to International Harvester Company, a corporation of New Jersey Application December 29, 1945, Serial No. 638,123

4 Claims. (Cl. 280—152)

This invention relates to tractor-mounted agricultural implements and particularly to lifting connections between the tractor and implement.

An object of the invention is to provide in a tractor-mounted implement an improved lifting structure connecting the implement to the tractor for movement of the implement to and from transport position.

Another object is to provide for use with an implement connected to a tractor having power lift mechanism thereon, improved means for mounting the lifting structure by which the implement is connected to the tractor.

Another object is to provide on a tractor, improved means for supporting the rock-shaft by which lifting power is transmitted to the implement.

A further object is to provide quick attachable means for mounting a rock-shaft upon the fender of a tractor, thus affording a dual function for the tractor fenders.

Other objects and advantages will become apparent from the following detailed description when read in conjunctiin with the accompanying drawings, wherein:

Figure 1 is a view in side elevation of a rear portion of a tractor partly in section, showing an implement connected thereto and embodying the features of the present invention.

Figure 2 is an enlarged detail showing the attaching structure by which the rockable lifting mechanism is connected to the tractor fenders.

Figure 3 is a plan view of the lifting rock-shaft connected to the tractor fenders.

Figure 4 is a detail showing one end of the rockable structure prior to connection thereof to the tractor fender and illustrating the manner in which the connection is made.

Figure 5 is a view similar to Figure 4 after the connection has been made.

Referring to the drawings, the numeral 10 designates the longitudinally extending body of a tractor having a transverse rear axle structure 11, depending stub axle housings 12, and rear drive wheels 13 only one of which is shown.

Connected to the laterally spaced stub axle housings 12 are the rearwardly extending arms of a draw-bar 14 to which is attached for vertical and lateral pivotal movement a draft structure generally indicated at 15, provided at its rear end with one or more clamps 16 for connection to a transverse tool-bar 17 to which is secured a longitudinally extending beam 18 which curves downwardly and is provided at its lower end with an earth-working tool in the form of a middle buster 19.

Vertical movement of the implement to and from transport position on the tractor is accomplished by lifting mechanism generally indicated at 20 and including a transverse rock-shaft 21 having its ends mounted for rotation in bearings 22 secured in a manner hereinafter to be described to laterally spaced fenders 23, each of which is secured to the rear axle structure 11 at opposite sides of the tractor body 10. Affixed to one end of the rock-shaft 21 is a rearwardly extending lift arm 24, and upon the opposite end of the shaft 21 is mounted a sleeve member 25 having secured thereto a rearwardly extending lifting arm 26 parallel to arm 24. Lifting connection is made between the arms 24 and 25 and the implement by means of a link structure generally indicated at 27. This link structure 27 and the hitch structure 15 form no part of the present invention, and further details thereof may be found by reference to pending United States application Serial No. 514,008, filed December 13, 1943 now Patent No. 2,420,530.

Affixed to the shaft 21 adjacent the sleeve member 25 is an upwardly extending arm 28 having a forwardly extending ear 29 thereon having one end of a connecting rod 30 pivotally mounted thereupon. The forward extending end of connecting rod 30 is pivoted upon a rock arm 31 mounted on the tractor and rocked by power derived therefrom. A rearwardly extending lug 32 on the arm 28 is apertured to receive a crank 33, one end of which is threaded for reception in a sleeve 34 pivotally connected to the lift arm 26 whereby the circumferential position of the arm 26 with respect to the arm 24 may be varied to level the implement.

Novel means are provided for the connection of the rockable structure 20 to the tractor fenders whereby the connection and removal of the structure may be made quickly and easily. Each of the bearings 22 is provided with a flange 35 having spaced bosses 36 thereon apertured to receive a carriage bolt 37 having its head portion 38 projecting therefrom and held against displacement from the bearing by a nut 39. The fender 23 is provided with a pair of keyhole slots 40 having an enlarged portion 41 and a restricted end 42. It should be understood, of course, that the structure of each of the bearings 22 is substantially identical and that similar pairs of keyhole slots 40 are provided in each of the fenders 23.

Referring particularly to Figures 4 and 5, it will be noted that the rockable structure 20 is presented between the fenders 23 and is finally seated in line with the keyhole slots 40. The fenders 23 are generally upright and flared outwardly as indicated in the drawings, the slots 40 being located in the flared portion providing openings receptive to the insertion of objects in both horizontal and vertical planes. The length of rockable structure 20 is so chosen as to be approximately equal to the distance between the fenders 23 at the slotted portions thereof, and the bearings 35 are shaped to conform to the contour of and mate with the fenders 23. Likewise, as viewed in Figure 4, the head 38 of the bolt 37 projecting generally axially from the rockable structure 20 is in a direct line with the enlarged part 41 of the keyhole slot 40 in each of the fenders 23. The slots thus have width transversely of the tractor, so that the distance between the enlarged portions of the slots is equal to the length of the shaft from bolt head to bolt head. Therefore, it will be clear that upon advance of the rockable structure in an axial direction between fenders, the bolt head 38 will be received in the enlarged portion 41 of the slot, and that the flange portion 36 of each of the bearings 22 will fit closely against the face of the fender 23.

It will likewise be noted that the bolt 37 is provided with a squared neck portion 43 adjacent the head 38 thereof, and that upon advance of the rockable structure 20 between the fenders 23 to the position shown in Figure 5, the squared portion 43 of the bolt 37 will be seated in the restricted end 42 of the keyhole slot. The restricted portion of the slot thus extends longitudinally of the tractor and the transverse spacing therebetween is approximately equal to the length of the rock-shaft proper. The length of the squared portion 43 is chosen to conform to the thickness of the fender 23, and the entire rockable structure is tightened in its position between the fenders by the nuts 39.

It will therefore be clear that a novel means has been provided for quickly and removably attaching a rock-shaft structure to the fenders of a tractor. Likewise the rockable structure 20 is readily removed from its position between the fenders 23 by simply loosening the nuts 39 and withdrawing the rockable structure in a radial direction from the fenders 23 so that the bolt heads 38 will pass out of the enlarged portions of the keyhole slots.

Having described the invention it should be understood that various modifications may be made therein without departing from the spirit thereof or the scope of the appended claims.

What is claimed is:

1. The combination with a tractor having a rear axle structure and laterally spaced drive wheels, of laterally spaced members secured to said axle structure and parallel to said wheels, each said member comprising a sheet of relatively thin material having a generally upright portion secured to the axle structure and a flared outer portion, said members being provided with slots extending from the outwardly flared portion to the upright portion and terminating in a laterally removed restricted portion, whereby said slots have width in both longitudinal and transverse planes, a rockable structure generally equal in length to the distance between the upright portions of said members and provided at each end with fastening means of a conformation to mate with the flared portion of said members including generally axially projecting bolt means adapted to be received and retained in the horizontal portion of said slots upon presentation of the rockable structure in a radial direction between said members, and means for securing said bolt means in said slot.

2. The combination with a tractor having laterally spaced drive wheels, of laterally spaced fenders adjacent said wheels and parallel thereto, each said fender being flared outwardly and provided with a keyhole slot in the flared portion thereof, whereby said slots have width in both longitudinal and transverse planes, each said slot having an enlarged bolt-receiving portion and a restricted portion at its inner end laterally spaced therefrom, a rockable structure extending transversely between said fenders and provided at its ends with fastening members of a conformation to mate with said fenders including generally axially projecting bolts adapted to be received and retained in the horizontal portion of said slots upon presentation of the rockable structure in a radial direction between said fenders and to be seated in the restricted portion of said slots upon further advance of said rockable structure between said fenders, and means for securing said bolts in said slots.

3. The combination with a tractor having a transverse rear axle structure and laterally spaced drive wheels, of laterally spaced fenders adjacent said wheels and parallel thereto, each said fender comprising an upright portion generally parallel to the direction of travel of the tractor secured to the axle structure and a flared outer portion, a rockable structure extending transversely between said fenders, bolts projecting from the ends of said structure having a head, a threaded shank and a squared neck portion of a length substantially equal to the thickness of said fenders, said fenders being provided with keyhole slots in the flared portion thereof adapted to receive and retain said bolts upon presentation of the rockable structure in a radial direction between said fenders and terminating in a restricted portion shaped to seat the squared neck portion of said bolts.

4. The combination with a tractor having a transverse rear axle structure and laterally spaced drive wheels, of laterally spaced fenders adjacent said wheels and parallel thereto, each said fender comprising an upright portion generally parallel to the direction of travel of the tractor secured to the axle structure and a flared outer portion, said fenders being provided with keyhole slots in the flared portion thereof, each said slot having an enlarged bolt-receiving portion and terminating in a restricted portion laterally spaced therefrom, a transverse rock shaft between said fenders, a flanged bearing rockably supporting each end of said shaft and shaped to conform to the flared portion of said fenders, bolt means carried by said bearings adapted to be received and retained in said slots upon presentation of the rock shaft in a radial direction between said fenders and to be seated in the restricted portion thereof, and means for securing said bearings to said fenders.

JOHN R. ORELIND.

REFERENCES CITED

The following references are of record in the file of this patent:

UNITED STATES PATENTS

| Number | Name | Date |
|---|---|---|
| 1,254,094 | Vogt | Jan. 22, 1918 |
| 1,296,289 | Hill | Mar. 4, 1919 |
| 1,529,074 | Link | Mar. 10, 1925 |
| 1,624,860 | Cocks | Apr. 12, 1927 |
| 1,831,997 | Brown | Nov. 17, 1931 |
| 2,239,332 | Mee | Apr. 22, 1941 |
| 2,239,387 | Johnson | Apr. 22, 1941 |
| 2,371,839 | Orelind | Mar. 20, 1945 |
| 2,420,530 | Evans | May 13, 1947 |